Oct. 30, 1962  J. A. KING  3,061,035
POWERED VEHICLES
Filed Oct. 25, 1960
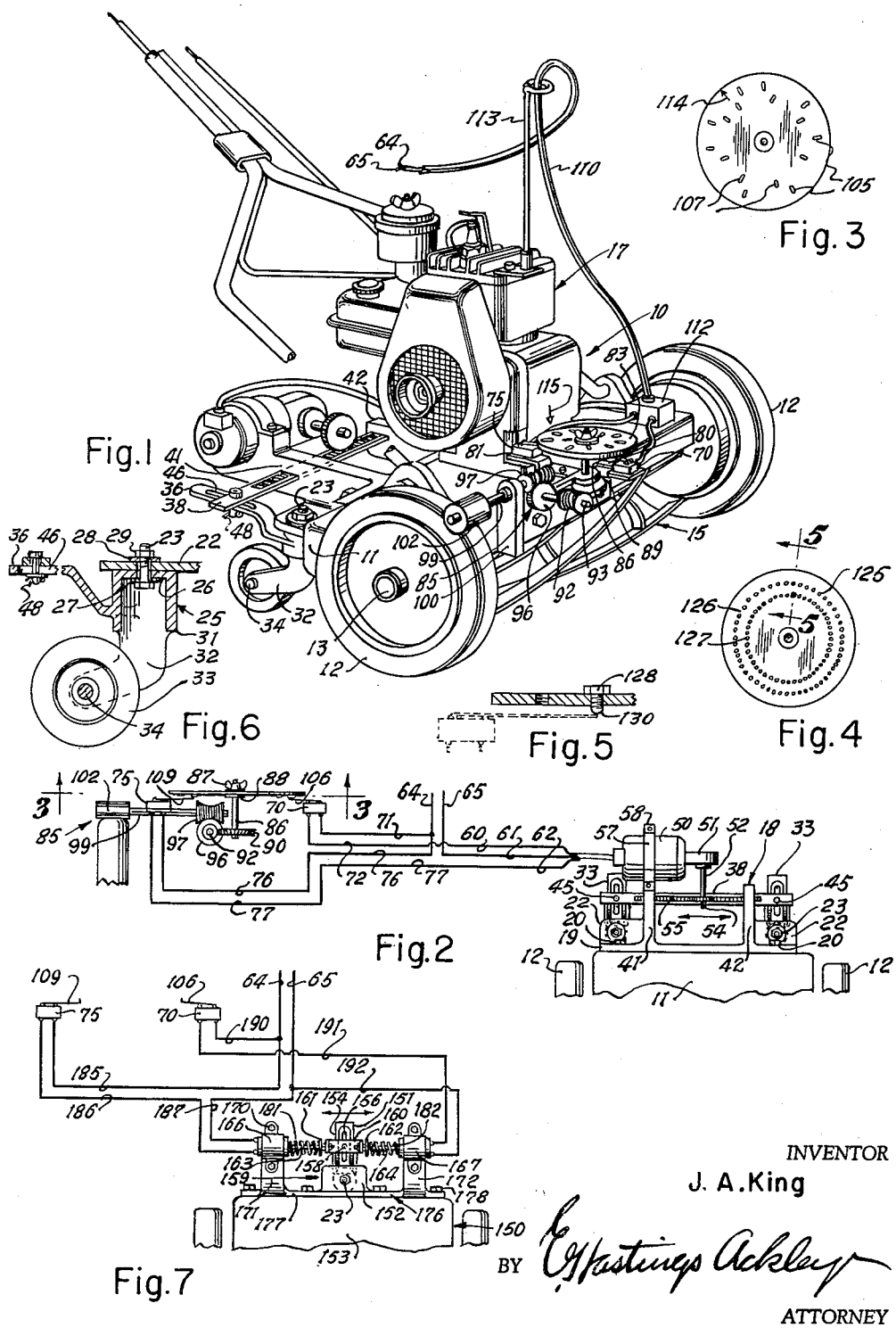
INVENTOR
J. A. King
BY *E. Hastings Ackley*
ATTORNEY United States Patent Office 3,061,035
Patented Oct. 30, 1962

3,061,035
POWERED VEHICLES
J. A. King, 2312 Quinto Drive, Dallas 27, Tex.
Filed Oct. 25, 1960, Ser. No. 64,878
9 Claims. (Cl. 180—79.1)

This invention relates to powered vehicles and more particularly to automatic self steering vehicles.

An object of the invention is to provide a new and improved self propelled vehicle which is self steering and thereby does not require manual steering supervision of an operator.

Another object is to provide an improved vehicle, such as a power lawnmower having self contained steering control means effective to determine the path of travel of the mower in a manner to insure the cutting of a given area of grass.

A further object is to provide a power mower having power means for actuating the steering mechanism of the power mower in accordance with the movement of the power mower to cause the power mower to travel in a predetermined path to assure cutting of a given area of grass.

Another object is to provide a power mower having electrically powered means for actuating the steering mechanism of the power lawnmower which has means operatively associated with a ground engaging wheel of the power mower for causing said steering means to be actuated at predetermined points in the path of the movement of the power mower to cause the power mower to turn in predetermined directions whereby the power mower is caused to travel in a predetermined path to assure the cutting of a given area of grass.

Additional objects and advantages of the invention will be readily apparent from the reading of the following description of a device constructed in accordance with the invention, and the reference to the accompanying drawings thereof, wherein:

FIGURE 1 is a perspective view of a self propelled power mower having the automatic steering means embodying the invention;

FIGURE 2 is a fragmentary diagrammatic illustration of the steering mechanism of the lawnmower illustrated in FIGURE 1;

FIGURE 3 is a plan view of a control disk of the steering mechanism illustrated in FIGURES 1 and 2;

FIGURE 4 is a plan view of a modified form of the steering disk illustrated in FIGURE 3;

FIGURE 5 is a sectional view taken on line 5—5 of FIGURE 4;

FIGURE 6 is a fragmentary sectional view of the steering wheel mounting; and

FIGURE 7 is a fragmentary partly diagrammatic view of a modified form of the steering control means.

Referring now particularly to FIGURES 1, 2 and 3 of the drawings, the automatic steering controls means embodying the invention is shown mounted on a self propelled lawnmower 10 having a chassis 11 on which is mounted an internal combustion engine connected by any suitable transmission means to the ground engaging drive wheels 12 rotatably mounted on the chassis 11 by the means of shafts 13. The mower also includes the usual cutter reel 15 which cooperates with the usual fixed blade, not shown, to cut grass.

An internal combustion engine 17 is mounted on the chassis and is connected to the driven ground engaging wheels 12 by any suitable transmission.

The chassis is provided with a steering support bracket 18 having a vertical transverse member 19 which abuts a rear end of the chassis and is rigidly secured thereto by bolts 20 which extend through suitable apertures in the vertical transverse member into threaded bores of the chassis. A pair of horizontal side plates 22 of the steering support bracket are provided with vertical apertures through which extend the shanks of the bolts 23 which rotatably secure the wheel mounts 25 to the side plates. The shank of each bolt 23 extends through aligned apertures of the side plate and of the top plate 26 of the wheel mount. A washer 27 is interposed between the head of the bolt and the top plate and a similar washer 28 is interposed between the upper surface of the side plate 22 and the nut 29 threaded on the upper end of the bolt. Each wheel mount has a substantially cylindrical portion 31 depending from the top plate 26 and a pair of spaced angularly downwardly and rearwardly extending parallel arms 32, each of the rear steering wheels 33 being disposed between the arms 32 of its associated wheel mount and being rotatably mounted thereon by means of the shaft 34 suitably journaled in the arms.

Each of the wheel mounts has a rearwardly extending steering arm 36 which are connected to one another by a rack gear 38. The rack gear extends slidably through aligned apertures in the rearwardly extending support arms 41 and 42 of the steering support bracket 18. The rack gear is provided at its opposite ends with suitable vertical apertures through which extend the connecting pins 45 which also extend through the elongate slots 46 of the steering arms of the wheel mounts. The connecting pins may be provided with heads which limit passage of the connecting pins in one direction through the apertures of the rack gear and with any suitable means, such as the cotter keys 48, for limiting movement of the connecting pins in the opposite direction. The connecting pins are slidable in the slots 46 of the steering arms in order that transverse movement of the rack gear may pivot the wheel mounts in one direction or the other to change the direction of movement of the lawnmower as it travels over a lawn.

The rack gear 38 is caused to move transversely when the motor 50 is energized. The drive shaft of the electric motor is connected through a suitable speed reducing transmission 51 to a drive shaft 52 provided with a pinion gear 54 whose teeth mesh with the teeth 55 of the rack gear. The motor is received in an arcuate upwardly opening recess of the support arm 41 and is secured thereto by an arcuate bar or strap 57 secured to the support arm 41 by bolts 58 which extend through suitable apertures of the strap into threaded bores of the support arm 41.

The motor may be of any suitable reversible type. It may have, for example, three conductors 60, 61 and 62, the drive shaft of the motor rotating in one direction when the conductors 60 and 61 are connected to the input conductors 64 and 65 and rotating in the opposite direction when the conductors 61 and 62 are connected to the input conductor. The conductors 60 and 61 are connectable across the input conductors 64 and 65 by the conductors 71 and 72 and the switch 70 when the latter is closed. The conductor 71 has one end connected to the input conductor 64 and its other end to one contact of the switch 70. The conductor 72 has one end connected to the other contact of the switch 70 and its other end to the conductor 60. The conductor 61 is connected directly to the input conductor 65. The conductors 61 and 62 are similarly connected across the input leads 64 and 65 by means of the conductors 76 and 77 and the switch 75 when it is closed. The conductor 76 has one end connected to the input conductor 64 and its other end to one contact of the switch 75 while the conductor 77 has one end connected to the other contact of the switch 75 and has its other end connected to the conductor 62 of the motor. It will thus be apparent that when the switch 70 is closed, the motor 50 is energized to cause the shaft 52 to rotate in one direction and that when the switch 75 is closed, the motor is energized to cause the shaft 52 to rotate in the opposite direction.

The switches 70 and 75 are secured to the chassis 11 in any suitable manner, as by brackets 80 and 81, respectively, which are secured to the chassis by bolts, welding or any other suitable means. The switches are closed in predetermined sequence and at predetermined points in the path of movement of the lawnmower over a given area of grass by means of a program disk 83 which is rotated in accordance with the movement of the lawnmower over the given area by a connecting transmission 85. The connecting transmission rotates the program disk 83 in accordance with the rotation of one of the driving wheels 12 of the lawnmower.

The program disk is detachably mounted on a vertical disk shaft 86 by a wing nut 87 threaded on the upper end of the shaft which holds the program disk against an external flange 88 of the disk shaft to prevent its rotatable movement relative to the disk shaft. The disk shaft is journaled on a suitable support bracket 89 secured in any suitable manner to the chassis 11 of the lawnmower.

The connecting transmission 85 includes a gear 90 rigidly secured to the disk shaft whose teeth mesh with a worm gear 92 rigidly mounted on the shaft 93 which is journaled to the chassis 11 in any suitable manner. The shaft 93 also has a gear 96 rigidly secured thereto which meshes with the worm gear 97 rigidly mounted on a shaft 99 journaled in a bracket 100 rigidly secured, as by welding, to the chassis 11 of the lawnmower. A roller 102, which may be of a resilient substance, such as rubber, is rigidly secured to the shaft 99 and frictionally engages the periphery of one of the ground engaging drive wheels 12 of the lawnmower.

It will be apparent that as the wheel 12 rotates, it imparts rotational movement to the shaft 99 due to its engagement with the roller 102, and thence through the gears 97, 96, 92 and 90 imparts rotational movement to the disk shaft 86. The disk shaft is thus caused to rotate in accordance with the rotation of the ground engaging wheel and in accordance with the movement of the lawnmower over the given area of grass which is to be mowed. It will be apparent, of course, that the connecting transmission 85 acts as a speed reducing means so that the program disk rotates only once for a given number of revolutions of the ground wheel 12 about its shaft 13.

The program disk may be of metal and be formed with indentations which provide a series of downwardly projecting cam surfaces 105 for engaging the actuating arm 106 of the switch 70 and with a series of downwardly projecting cam surfaces 107 which are adapted to engage the actuating arm 109 of the switch 75. The indentations which form the cam surfaces 107 are spaced radially inwardly of the indentations which form the cam surfaces 105 so that the actuating arm of the switch 70 will not be engaged by the cam surfaces 107 and the actuating arm 109 will not be engaged by the cam surfaces 105. The indentations are so spaced on the program disk that the motor will be energized at such points in the path of travel of the mower as to cause the mower to completely mow the grass in a given area.

It will, of course, be apparent that a different program disk having indentations formed therein at different locations will be required for each different area of grass over which the lawnmower is to travel.

The power to the electric motor 50 is supplied through a cord 110 which has the input conductors or leads 64 and 65 which extends through the connector box 112. A suitable guide 113 may be mounted on the lawnmower to hold the cord properly spaced from the reel and the ground engaging wheels.

In use, when it is desired to mow a given tract or area, the lawnmower is positioned at a preselected starting point and the starting index mark 114 of the program disk is aligned with the index mark 115 located on any suitable adjacent structure of the lawnmower. The input conductors 64 and 65 are then connected with a suitable source of electric current and the internal combustion motor 17 of the lawnmower is started. The mower is allowed to proceed under its own power to travel in a predetermined direction from the starting point. As the lawnmower travels over the area, the drive wheel 12 causes the roller 102 to rotate. Since the roller 102 is connected to the disk shaft 86 by the speed reducing transmission 85, the program disk 83 is also caused to rotate relative to the actuating arms 106 and 109 of the switches 70 and 75, respectively. The program disk is provided with an indentation 105 or 107 spaced at the required distance from the index mark 114 which causes the lower camming surface provided thereby to engage one of the actuating arms, for example, the actuating arm 106, when the lawnmower has traveled to a point along its path where it is necessary that it turn, for example, to the right. The depression of the actuating arm 106 by such cam surface of the indentation 105 then energizes the motor 50 to cause the rack gear to be moved transversely relative to the lawnmower to cause the mounts for rear steering wheels to be moved about their vertical axis to cause such turning movement of the lawnmower. Since the speed reducing transmission 51 is interposed between the drive shaft of the motor 50 and the shaft 52 of the gear 54 which engages the rack gear, once the rack gear has been moved to any desired position, it is held in this position due to the great friction inherent in any speed reducing mechanism even after the camming surface moves out of engagement with the actuating arm 106 and the motor is de-energized as the switch opens. The steering wheels will then be held in such position causing such turning movement of the lawnmower at the preselected point in the path of movement of the lawnmower until one of the cam surfaces formed by one of the indentations 107 of the rack gear engages the actuating arm 109 of the switch 75 to close the switch 75. The motor will then rotate in the opposite direction to cause the steering wheels to pivot about their vertical axis in opposite direction to again change the course of direction of movement of the lawnmower over the area of grass. The degree to which the wheel mounts 25 are pivoted about their vertical axis may of course be varied by varying the width of the cam surfaces formed by the indentations. The spacing of the various indentations 105 and 107 will predetermine the points at which the mounts will be rotated in one direction or another.

The program disk is preformed for each particular area of lawn which is to be cut by the lawnmower in order that the lawnmower turn at predetermined points to assure that the whole area is mowed.

It will be seen that a plurality of program disks may be formed for use with the lawnmower, each for a different area or tract of lawn which is to be cut.

It will now be seen that the steering control means or steering mechanism includes a programming disk or means for pivoting mounts of the rear steering wheels of a self propelled lawnmower in desired direction at predetermined points in the path of travel of the lawnmower by energizing a power means, such as the electric motor 50.

It will further be seen that the programming disk is actuated in accordance with the movement of the lawnmower by a transmission 85 which connects the disk shaft 86 to one of the ground engaging wheels 12 of the lawnmower.

It will further be seen that the program disks 83 may be easily enterchanged so that the lawnmower may be used to mow the lawn on areas of different shapes and dimensions without any extensive or laborious changes or adjustments of the steering mechanism.

In FIGURES 4 and 5 is illustrated another form of the program disk wherein the program disk 125 is provided with two radially spaced series of threaded holes 126 and 127 into which the bolts 128 may be threaded to have their lower cam ends 130 extend downwardly of the program disk to engage the actuating arms of the solenoids. It will be apparent that the cam surfaces of the bolts may be ground to have the proper desired widths to cause the steering wheels to be pivoted to the proper desired degree by the motor 50 at particular points in the path of travel of the lawnmower.

It will be apparent that the bolts 128 must be removably mounted in the program disk 125 so that a single disk may be employed to mow lawns of different dimensions and configurations, the appropriate bolts 128 being threaded through the appropriate apertures 126 and 127 for the particular area or tract of the lawn to be mowed.

In FIGURE 7 is illustrated another form of the steering control means or mechanism for a lawnmower 150 having a single central rear steering wheel 151 which is mounted on a wheel mount 159, of the same type as the mounts 25 illustrated in FIGURE 6, which is secured for rotational movement about a vertical axis to the end plate 152 of the chassis 153 of the lawnmower 150 by the bolt 23. The steering arm 154 of the steering wheel mount is provided with an elongate slot 156 which slidably receives a bolt or pin 158 which extends downwardly through a suitable aperture in an actuating lever 160. The actuating lever is substantially U-shaped having upwardly extending legs 161 and 162 to which are rigidly secured the stems 163 and 164 of the plunger of the solenoids 166 and 167, respectively.

The solenoids are mounted by means of the bolts 170 on the rearwardly extending support arms 171 and 172 respectively, of a support bracket 176 whose vertically extending plate 177 is secured to the chassis in any suitable manner, as by bolts 178 which extend through the plate into suitable threaded bores in the chassis of the lawnmower.

The steering bracket 160 is biased to the neutral or central position illustrated in FIGURE 7 by springs 181 and 182 disposed about the plunger stems 163 and 164, respectively, of the solenoids. The compression spring 182 has its opposite ends bearing against the housing of the solenoid 166 and the leg 161 of the steering bracket and the spring 182 has its opposite ends bearing against the leg 162 of the steering bracket and the housing of the solenoid 167. As a result, when neither of the solenoids is energized, the steering wheel is held in the neutral or central position illustrated in FIGURE 7 and the lawnmower travels in a straight path.

The solenoid 166 is energized to pull its plunger stem to the left as seen in FIGURE 7 and thus cause the spring 181 to be compressed and the lawnmower to turn to the right when it is connected across the input conductors 64 and 65 by the closing of the switch 75 when the actuating arm 109 thereof is depressed by the engagement of the camming surface provided by the indentation 107 of the program disk 83. The solenoid 166 is then connected across the input conductors 64 and 65 through the conductor 185, the switch 75 and the conductors 186 and 187. The width of the particular cam surface determines the length of time that the solenoid 166 is energized and therefore the degree of the turning movement of the mower. When the solenoid 166 is deenergized due to the fact that the program disk rotates and moves the cam surface of the particular indentation 107 to move out of engagement with the actuating arm 109 and thus permits the switch 75 to open, the force of the spring 181, which has been compressed, now moves the steering wheel mount and therefore the steering wheel back to its central position thus stopping further turning movement of the lawnmower as it continues in its path of travel.

The solenoid 167 when energized pivots the wheel mount to the right, as seen in FIGURE 7, against the resistance of the spring 182 and thus causes the steering wheel to be pivoted to the right or in a clockwise manner about the pivot bolt 23 to cause the lawnmower to turn to the left. The solenoid 167 of course is energized whenever the cam surface formed by a depression 105 of the program disk 83 engages the actuating arm 106 of the switch 70. The solenoid 167 is connected across the input conductors 64 and 65 whenever the switch 70 is closed through the conductor 190, the switch 70, the conductors 191 and 192. The lawnmower will continue to make a left turning movement until the particular cam surface provided by the particular indentation 105 of the program disk moves out of engagement with the actuating arm 106 of the switch 70 and permits the switch 70 to open thus deenergizing the solenoid 167. At this time the force of the compressed spring 182 will again move the steering wheel to its neutral or central position and thus cause the lawnmower to stop turning during its continued travel.

It will be apparent of course that the program disk 83 and the transmission 85 and the switches 70 and 75 may be employed in the same manner with a solenoid actuated steering device as with the electric motor 50 actuated device to control the path of travel of the lawnmower in a predetermined path to cause the lawnmower to mow a given area of grass.

It will further be apparent that while the motor 50 has been described as supplied with electric current from a remote source through the cord 113, that if desired, the lawnmower or other vehicle may be provided with a battery or generator for energizing either the motor or the solenoids.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A steering control device for a self propelled lawnmower having a ground engaging wheel and a steering wheel including: power means for turning said steering wheel; separate control means for selectively energizing said power means to cause turning of said steering wheel in opposite directions; program means for actuating said separate control means individually in a predetermined sequence; and means for advancing said program means in accordance with the movement of said lawnmower to actuate said control means in said sequence, said separate control means comprising switches, said program means comprising a disk rotatably advancing in accordance with the movement of said lawnmower and having means engageable with said switches to close said switches in a predetermined sequence.

2. The steering control device of claim 1 wherein said program means includes a disk rotatably advanced in accordance with the movement of said lawnmower and having means engageable with said control means for selectively actuating said control means.

3. The steering control device of claim 2 wherein said disk is provided with a plurality of circumferentially spaced apertures for receiving means which project outwardly of said disk and are engageable with said control means.

4. A steering control device for a self propelled lawnmower having a ground engaging wheel and a steering wheel including: power means for turning said steering wheel; separate control means for selectively energizing said power means to cause turning of said steering wheel in opposite directions; program means for actuating said separate control means individually in a predetermined sequence; and means engageable with said ground engaging wheel of said lawnmower for advancing said program means in accordance with the movement of said lawnmower to actuate said control means in said sequence, said power means including a reversible motor and said separate control means including switches sequentially closable to cause rotation of the drive shaft of said motor in opposite directions at predetermined points in the path of movement of said lawnmower.

5. A steering control device for a self propelled lawnmower having a ground engaging wheel and a steering wheel including: power means for turning said steering wheel; separate control means for selectively energizing said power means to cause turning of said steering wheel in opposite directions; program means for actuating said separate control means individually in a predetermined sequence; and means engageable with said ground engaging wheel of said lawnmower for advancing said program means in accordance with the movement of said lawnmower to actuate said control means in said sequence, said power means including a pair of solenoids each individually energizable by an associated one of said control means for turning said steering wheel in opposite directions, said separate control means comprising switches.

6. A steering control device for a self propelled lawnmower having a ground engaging wheel and a steering wheel including: power means for turning said steering wheel; separate control means for selectively energizing said power means to cause turning of said steering wheel in opposite directions; program means for actuating said separate control means individually in a predetermined sequence; and means engageable with said ground engaging wheel of said lawnmower for advancing said program means in accordance with the movement of said lawnmower to actuate said control means in said sequence, said power means including a reversible motor and said separate control means including switches sequentially closable to cause rotation of the drive shaft of said motor in opposite directions at predetermined points in the path of movement of said lawnmower, said program means comprising a disk rotatably advanced in accordance with the movement of said lawnmower and having means engageable with said switches to close said switches in a predetermined sequence.

7. The steering control device of claim 6 wherein said means engageable with said switches to close said switches in a predetermined sequence includes cam surfaces extending outwardly of said disk.

8. The steering control device of claim 7 wherein said disk is provided with a plurality of circumferentially spaced apertures and wherein said cam surfaces are provided by means insertable in selected ones of said apertures whereby the path of movement of said lawnmower may be easily programmed.

9. A steering control device for a self propelled lawnmower having a ground engaging wheel and a steering wheel including: power means for turning said steering wheel; separate control means for selectively energizing said power means to cause turning of said steering wheel in opposite directions; program means for actuating said separate control means individually in a predetermined sequence; and means engageable with said ground engaging wheel of said lawnmower for advancing said program means in accordance with the movement of said lawnmower to actuate said control means in said sequence, said power means including a pair of solenoids each individually energizable by an associated one of said control means for turning said steering wheel in opposite directions, said separate control means comprising switches, said program means comprising a disk rotatably advanced in accordance with the movement of said lawnmower and having means engageable with said switches to close said switches in a predetermined sequence.

References Cited in the file of this patent

UNITED STATES PATENTS

| | | |
|---|---|---|
| 1,570,547 | Avera | Jan. 19, 1926 |
| 2,321,874 | Tandler et al. | June 15, 1943 |
| 2,496,727 | Jenkins | Feb. 7, 1950 |
| 2,674,331 | Ovshinsky | Apr. 6, 1954 |
| 2,674,332 | Ovshinsky | Apr. 6, 1954 |
| 2,751,030 | Null | June 19, 1956 |